April 14, 1936.  W. J. ROBINSON ET AL  2,037,539
PRINTED CRINKLED RUBBER AND METHOD OF MAKING SAME
Filed Sept. 19, 1934
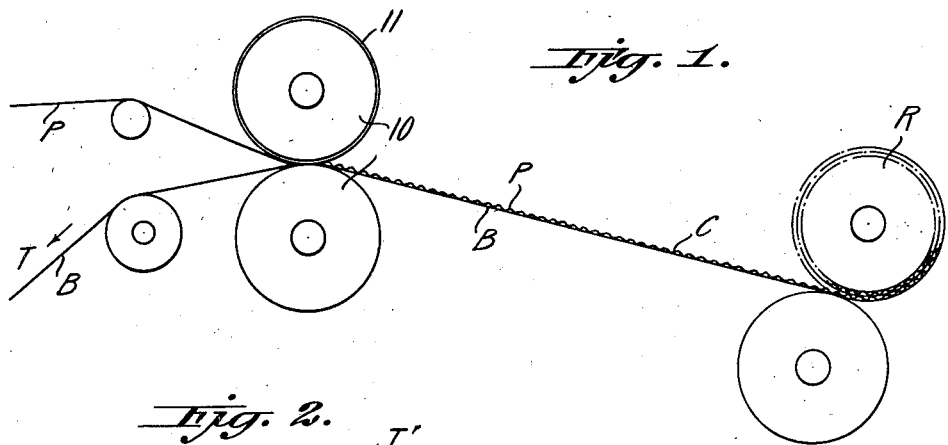
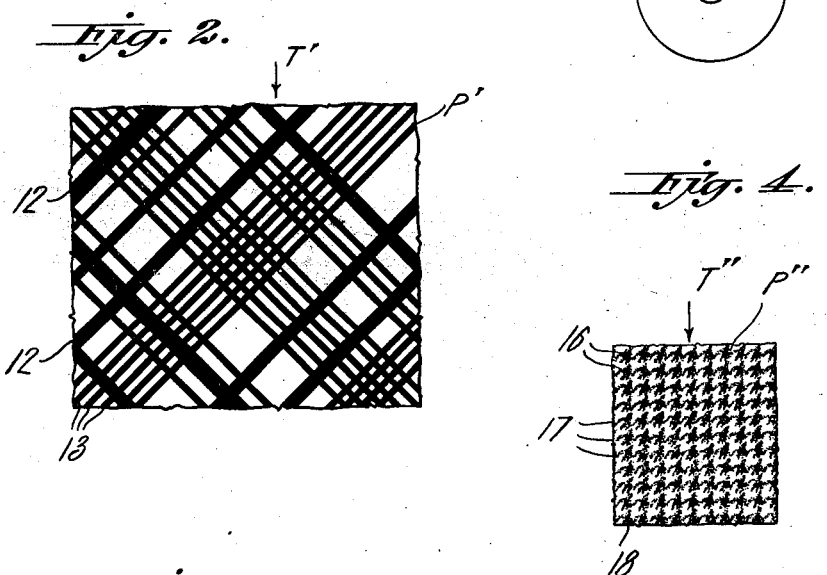
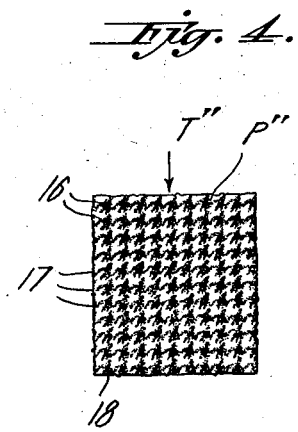
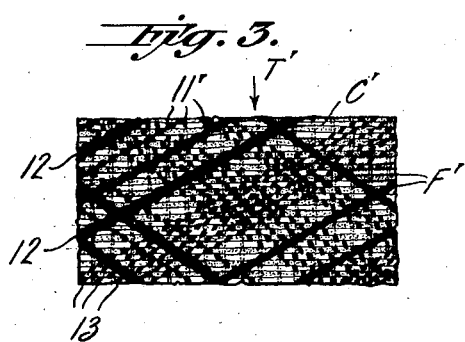
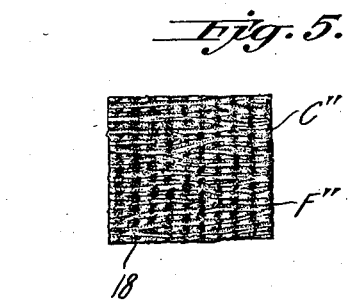
INVENTORS
WILLIAM J. ROBINSON
JAMES J. GALLIGAN
BY
ATTORNEY.

Patented Apr. 14, 1936

2,037,539

UNITED STATES PATENT OFFICE 2,037,539

PRINTED CRINKLED RUBBER AND METHOD OF MAKING SAME

William J. Robinson and James J. Galligan, Providence, R. I., assignors to United States Rubber Company, New York, N. Y., a corporation of New Jersey Application September 19, 1934, Serial No. 744,676

8 Claims. (Cl. 41—24)

Our invention relates to printed and crinkled sheet rubber and the method of making such rubber.

Methods and apparatus for crinkling rubber are described in our copending applications bearing Serial Number 614,172, filed May 28, 1932, and Serial No. 631,313, filed September 1, 1932. Such methods and apparatus may be used in the practice of our present invention in which the rubber is crinkled by stretching a partially cured or uncured sheet of rubber and while stretched tacking at spaced intervals to another relaxed sheet of partially cured or uncured rubber. Upon release of the stretched sheet, contraction takes place in the composite sheet and causes the relaxed sheet to be crinkled.

We have now found that if the relaxed or unstretched sheet is printed with a design before being crinkled, preferably a color design, either in continuous or intermittent printed lines, the crinkling operation produces a new and novel rubber effect and a wide variety of effects may be secured. These effects may be materially increased if a wide variety of colors are used and/or the printed lines are at an angle to the folds produced in the composite crinkled sheet.

When the printed lines are at an angle to the folds in the crinkled rubber it is possible to print solid lines of color on the rubber before it is crinkled and have the lines appear in the rubber as a solid line or as a broken line depending upon the width of the lines and the distance between the folds. When the lines are relatively narrow they may be so broken at regular intervals that alternate rows of printed color or basic color lines may be produced in the crinkled rubber and arranged at an angle to the original printed lines. In this manner a somewhat mottled or speckled effect may be produced. The mottled effect may be intensified when discontinuous figures are used in the original printed design.

On the other hand, if discontinuous figures are arranged in rows substantially perpendicular to the folds produced in the crinkled rubber these discontinuous figures or broken lines may be changed into substantially continuous lines after the rubber is crinkled.

In the case where the printed areas are broken by the folds in the crinkled rubber, the optical effect produced may be broadly described as a discontinuous line of printed color, or color combinations due to the fact that the continuity of the original printed lines and/or designs is broken by interpositioned areas of unprinted base stock, as what may be termed the "hills" of the crinkles are visible and the "valleys" are normally invisible. In the crinkling operation the "hills" and "valleys" are generally formed indiscriminately so that what was originally a continuous or regular design printed on the rubber becomes a more or less irregular mottled or speckled design after the crinkling operation.

The accompanying drawing shows certain present preferred embodiments of the printed rubber, methods and apparatus for making same.

Fig. 1 is a view of a skeletonized apparatus for crinkling the printed rubber;

Figs. 2 and 4 are views of plain unstretched sheets of rubber having different patterns printed thereon; and Figs. 3 and 5 are, respectively, views of the patterns shown in Figs. 2 and 4 after having been crinkled.

In the practice of our invention the printing is applied to a partially cured or uncured sheet of rubber and it is then crinkled which may be suitably done by the methods referred to in our copending applications. In the use of the method particularly described in our copending application Serial No. 631,313, the printed sheet of rubber P and a partially cured or uncured second sheet of rubber B are run together through the presser rolls 10 shown in Fig. 1, the printed sheet P is relaxed and the second sheet B is stretched in the direction of the arrow T when they are pressed together. Since the sheets P and B are tacky they are caused to stick together along spaced lines 11' as shown in Fig. 3 in their respective relaxed and stretched states by the circumferential ridges 11 on the upper presser roll 10. When the composite sheet has passed through the presser rolls 10 the stretched sheet B is allowed to relax and in so doing it draws the already relaxed sheet up into folds, producing "hills" and "valleys" in the printed side of the composite crinkled sheet of rubber C. As the composite sheet C of crinkled rubber is thus formed it is rolled up on a reel R and is afterwards cured to form a two ply crinkled sheet of rubber. If it is desired to make a single ply printed sheet, the second stretched sheet B is partially cured before it is run through the rolls 10 with the printed sheet P and is stripped from the printed sheet P after they have passed through the rolls 10 as described in our copending application Serial No. 614,172.

The printed crinkled effect may also be produced on both sides of a composite sheet by placing the stretched sheet B between two relaxed printed sheets P and running the sheets through the rolls 10 as described in our application Serial No. 631,313.

The printed patterns shown on the relaxed uncured sheets P' and P" in Figs. 2 and 4 have been selected to illustrate some of the novel effects that may be produced. The effects produced from the samples in Figs. 2 and 4 are respectively shown in the crinkled sheets C' and C" in Figs. 3 and 5.

In accordance with the example illustrated in Figs. 2 and 3 the lines are printed on the sheet P' in a diagonal direction to the arrow T' which indicates the direction the sheet is to be run through the rolls 10 to produce the folds F' therein transversely to the arrow as shown in Fig. 3. It will be noted that some wide lines 12 and some narrow lines 13 are shown in the original printed pattern. After the sheet P' is crinkled as shown in Fig. 3 the wide lines 12 are still continuous but the narrower lines 13 are broken by unprinted areas due to portions of the lines being completely hidden between the folds F'. The surface of the crinkled rubber being irregular the outline of the continuous lines 12, when viewed at an angle to the surface, appear uneven or wavy and the broken lines from any viewpoint produce a mottled appearance.

In the example illustrated in Figs. 4 and 5 the pattern printed on the relaxed sheet P" in Fig. 4 when crinkled produces a decided mottled effect as shown in the crinkled sheet C" in Fig. 5 and the appearance of the pattern is entirely changed. The pattern in Fig. 4 is composed of a number of irregular figures 16 arranged in horizontal and vertical rows 17 and 18, respectively. The pattern is crinkled by passing the sheet P" through the crinkling rolls in the direction of the vertical rows 18 as indicated by the arrow T". This operation produces folds F" extending transversely to the vertical rows 18 in the sheet P", and thereby gathers the figures 16 along the rows 18. The gathering of the figures along the rows 18 produces the appearance of substantially continuous lines, while portions of the figures 16 are hidden within the folds and unprinted areas are interpositioned among printed areas thereby producing in general a mottled effect in the crinkled pattern shown in Fig. 5. In this example the roller ridge lines 11' such as are shown in Fig. 3 are substantially obscured by the mottled effect and are not shown in Fig. 5.

While we have described our invention in reference to the examples illustrated herein, it will be understood that other effects can be produced with the use of various designs and colors without departing from our invention as defined by the scope of the appended claims.

Having thus described our invention, what we claim and desire to protect by Letters Patent is:

1. An article of manufacture comprising a plural ply sheet of rubber having a printed crinkled surface characterized by visible and invisible portions of printed designs being positioned respectively on the hills and in the valleys of the crinkles which produces a wavy irregular appearance in the printed designs.

2. An article of manufacture comprising a plural ply sheet of rubber having a printed crinkled surface on each side thereof characterized by visible and invisible portions of printed designs being positioned respectively on the hills and in the valleys of the crinkles which produces a wavy irregular appearance in the printed designs.

3. In the method of making printed crinkled rubber, the steps comprising printing a design on an uncured sheet of rubber and then crinkling the rubber to produce an irregular effect in which the appearance of the printed portion of the rubber is broken and given an irregular mottled effect by interposition of areas of the unprinted or differently colored stock.

4. Rubber sheet material having printed portions on one side of said material, said side having raised portions separated by depressions having contacting slopes, whereby portions of said printed side are hidden from view between said depressions, and thereby produce an irregular mottled effect.

5. Rubber sheet material having continuous areas printed on one side of said material, said side having generally parallel raised portions separated by valleys having contacting slopes, whereby portions of said continuous areas are hidden from view between said contacting slopes and the visible areas are rendered discontinuous to the view.

6. Rubber sheet material having continuous printed lines on one side of said material and extending diagonally to the length of said material, said side having generally parallel but irregularly broken ridges separated by valleys having contacting slopes, said ridges and valleys extending generally cross-wise of said material, and said lines being rendered invisible in part whereby the printed side of said material is given a mixed checkered and mottled appearance.

7. In the method of making printed crinkled rubber, the steps comprising, printing a variously colored design on a sheet of rubber, stretching a second sheet of rubber, adhering the printed sheet in a less stretched state than said second sheet to said second sheet at spaced intervals, and releasing said sheets so adhered and thereby permit said second sheet to contract and crinkle the printed sheet into alternate "hills" and "valleys" whereby portions of said printed surface are made invisible by the valleys and the visible printed portions are rendered irregular and discontinuous.

8. In the method of making printed crinkled rubber, the steps comprising printing lines on one side of a sheet of rubber so that the lines extend diagonally to the length of said sheet, stretching a second sheet of rubber in the direction of the length of said printed sheet, adhering said second sheet to said printed sheet at spaced intervals while said printed sheet is in a less stretched state than said second sheet, and releasing said sheets so adhered and thereby permitting said second sheet to contract and crinkle the printed sheet into generally parallel ridges and depressions, whereby portions of said lines are made invisible by the depressions and the visible portion of the crinkled rubber is given a mixed checkered and mottled appearance.

JAMES J. GALLIGAN.
WILLIAM J. ROBINSON.